US010911920B2

(12) United States Patent
Lee et al.

(10) Patent No.: US 10,911,920 B2
(45) Date of Patent: Feb. 2, 2021

(54) METHOD FOR WIRELESSLY COMMUNICATING WITH EXTERNAL DEVICE AND ELECTRONIC DEVICE SUPPORTING THE SAME

(71) Applicant: Samsung Electronics Co., Ltd., Suwon-si (KR)

(72) Inventors: Kyung Jun Lee, Suwon-si (KR); A Reum Ko, Seoul (KR); Jun Sik Kwon, Yongin-si (KR); Da Som Kim, Seoul (KR); Seong Bok Kim, Gwangju (KR); Chi Hwan Kim, Suwon-si (KR); Chun Ho Park, Seoul (KR); Han Seok Park, Suwon-si (KR); Mee Kyeong Lee, Seongnam-si (KR); Eui Bum Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/014,716

(22) Filed: Jun. 21, 2018

(65) Prior Publication Data
US 2018/0376528 A1  Dec. 27, 2018

(30) Foreign Application Priority Data

Jun. 27, 2017 (KR) .................. 10-2017-0081495

(51) Int. Cl.
*H04W 76/14* (2018.01)
*H04W 12/00* (2009.01)
(Continued)

(52) U.S. Cl.
CPC ............ *H04W 4/80* (2018.02); *H04L 1/0003* (2013.01); *H04W 8/005* (2013.01); *H04W 8/24* (2013.01);
(Continued)

(58) Field of Classification Search
CPC ..... H04W 76/14; H04W 4/80; H04W 12/003; H04W 12/06; H04W 1/0003; H04W 8/005; H04W 8/24; H04W 88/06
(Continued)

(56) References Cited

U.S. PATENT DOCUMENTS 8,090,767 B2   1/2012  Adler et al.
8,271,662 B1   9/2012  Gossweiler, III et al.
(Continued)

FOREIGN PATENT DOCUMENTS

KR    10-2016-0039445 A    4/2016

OTHER PUBLICATIONS

International Search Report dated Oct. 5, 2018, issued in International Application No. PCT/KR2018/007038.
(Continued)

*Primary Examiner* — Yemane Mesfin
*Assistant Examiner* — Intekhaab A Siddiquee
(74) *Attorney, Agent, or Firm* — Jefferson IP Law, LLP

(57) ABSTRACT

An electronic device is provided. The electronic device includes a display device to output a user interface, a memory, a communication interface to support a first wireless communication scheme and a second wireless communication scheme, and a processor electrically connected with the display device, the memory, and the communication interface. The processor outputs a user interface for performing a pairing with the external device, by using at least one of a history of a pairing with the external device, whether the second wireless communication scheme is activated, or user account information.

20 Claims, 9 Drawing Sheets

(51) Int. Cl.
*H04L 1/00* (2006.01)
*H04W 76/15* (2018.01)
*H04W 8/24* (2009.01)
*H04W 12/06* (2009.01)
*H04W 4/80* (2018.01)
*H04W 8/00* (2009.01)
*H04W 88/06* (2009.01)

(52) U.S. Cl.
CPC ......... *H04W 12/003* (2019.01); *H04W 12/06* (2013.01); *H04W 76/14* (2018.02); *H04W 76/15* (2018.02); *H04W 88/06* (2013.01)

(58) Field of Classification Search
USPC ........................................................ 370/329
See application file for complete search history.

(56) References Cited

U.S. PATENT DOCUMENTS

| | | |
|---|---|---|
| 8,606,933 B1 | 12/2013 | Gossweiler, III et al. |
| 8,954,003 B2 | 2/2015 | Chen |
| 9,015,381 B2 | 4/2015 | Adler et al. |
| 9,135,522 B2 | 9/2015 | Akagunduz |
| 9,438,671 B2 | 9/2016 | Chen |
| 9,661,255 B2 | 5/2017 | Keum et al. |
| 9,705,982 B2 | 7/2017 | Chen |
| 9,730,257 B2 | 8/2017 | Kwon et al. |
| 9,838,864 B2 | 12/2017 | Zhou et al. |
| 9,979,625 B2 | 5/2018 | McLaughlin et al. |
| 10,305,770 B2 | 5/2019 | McLaughlin et al. |
| 2009/0177783 A1 | 7/2009 | Adler et al. |
| 2012/0151106 A1 | 6/2012 | Adler et al. |
| 2013/0095753 A1 | 4/2013 | Chen |
| 2014/0212048 A1 | 7/2014 | Akagunduz |
| 2015/0140930 A1 | 5/2015 | Chen |
| 2015/0222517 A1 | 8/2015 | McLaughlin et al. |
| 2016/0048664 A1* | 2/2016 | Son ....................... H04W 12/08 726/19 |
| 2016/0100120 A1 | 4/2016 | Keum et al. |
| 2016/0105924 A1 | 4/2016 | Baek et al. |
| 2016/0127883 A1 | 5/2016 | Zhou et al. |
| 2016/0278151 A1 | 9/2016 | Kwon et al. |
| 2016/0359960 A1 | 12/2016 | Chen |
| 2017/0019935 A1* | 1/2017 | Palin ................... H04W 12/003 |
| 2017/0303326 A1* | 10/2017 | Kwon ................... H04W 8/005 |
| 2017/0353979 A1* | 12/2017 | Lee ......................... H04W 8/24 |
| 2018/0006746 A1* | 1/2018 | Yasuzaki ............ H04N 1/00307 |
| 2018/0176112 A1 | 6/2018 | McLaughlin et al. |
| 2019/0260660 A1 | 8/2019 | Abuan et al. |

OTHER PUBLICATIONS

Extended Search Report dated Apr. 20, 2020, issued in European Patent Application No. 18823488.4-1213.

* cited by examiner

METHOD FOR WIRELESSLY COMMUNICATING WITH EXTERNAL DEVICE AND ELECTRONIC DEVICE SUPPORTING THE SAME

CROSS-REFERENCE TO RELATED APPLICATION(S)

This application is based on and claims priority under 35 U.S.C. § 119 of a Korean patent application number 10-2017-0081495, filed on Jun. 27, 2017, in the Korean Intellectual Property Office, the disclosure of which is incorporated by reference herein in its entirety.

BACKGROUND

1. Field

The disclosure relates to a method for wirelessly communicating with an external device and an electronic device supporting the same.

2. Description of the Related Art

A mobile electronic device, such as a smartphone or a tablet personal computer (PC), has been increasingly used. The electronic device may perform various functions such as a calling function, a wireless communication function, a moving picture reproducing function, a music reproducing function, and a web-searching function. In addition, the electronic device may be used by wirelessly interworking (pairing) with various external devices. For example, the electronic device may be used by interworking with a device such as a wireless headset, a wireless earphone, a smart watch, a smart band, or the like through Bluetooth (BT) communication.

The above information is presented as background information only to assist with an understanding of the disclosure. No determination has been made, and no assertion is made, as to whether any of the above might be applicable as prior art with regard to the disclosure.

SUMMARY

According to the related art, the electronic device outputs a user interface for starting a pairing when an external device is in an out-of-box experience (OOBE) state. Alternatively, the electronic device outputs a user interface (e.g., a pop-up window) for starting a pairing when entering a forced pairing mode. In this case, a pairing history or user account information may not be reflected in a pairing procedure. In addition, when electronic devices, which are accessible to an external device, such as a wireless headset, are adjacent to each other, the electronic devices output the same pop-up screen for the pairing and the pop-up screen does not disappear, which causes inconvenience to the user.

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, an electronic device is provided. The electronic device includes a display device to output a user interface, a memory, a communication module to support a first wireless communication scheme and a second wireless communication scheme, and a processor electrically connected with the display, the memory, and the communication module. The communication module may receive an advertising signal, which is based on the first wireless communication scheme, from an external device. The advertising signal may include device identification information of the external device and pairing information representing whether the external device is currently paired with another device. The processor may determine, based on the pairing information, whether the external device is currently paired, when the external device is not paired, output a user interface for performing a pairing with the external device, by using at least one of a history of a pairing with the external device, whether the second wireless communication scheme is activated, or user account information, perform the pairing with the external device, in response to a user input made through the user interface, and may transceive, with the external device, data based on the second wireless communication scheme through the communication module, when the pairing is completed.

In accordance with an aspect of the disclosure, a method for wirelessly communicating with an external device is provided. The method includes receiving, from the external device, an advertising signal including device identification information of the external device and pairing information representing whether the external device is currently paired with another device, through a first wireless communication scheme, determining, based on the pairing information, whether the external device is currently paired, outputting a user interface for performing a pairing with the external device, by using at least one of a history of a pairing with the external device, whether a second wireless communication scheme is activated, or user account information, when the external device is not paired, performing the pairing with the external device, in response to a user input made through the user interface, and transceiving, with the external device, data based on the second wireless communication scheme when the pairing is completed.

As described above, according to various embodiments of the disclosure, in the wireless communication method and the electronic device, the user interface (e.g., a pop-up window) for the pairing depending on various situations may be output using the information on the history of the pairing, the activation information of Bluetooth (BT) communication, or user account information.

According to various embodiments of the disclosure, in the wireless communication method and the electronic device, the pairing information is reflected in real time such that the user interface (e.g., a pop-up window) for a pairing is removed from another device, when pairing with one of a plurality of devices is completed.

According to various embodiments of the disclosure, in the wireless communication method and the electronic device, it is determined whether a user interface (e.g., a pop-up window) for a pairing is output, depending on the intensity of the advertising signal or the distance between devices, thereby dynamically coping with various connection situations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
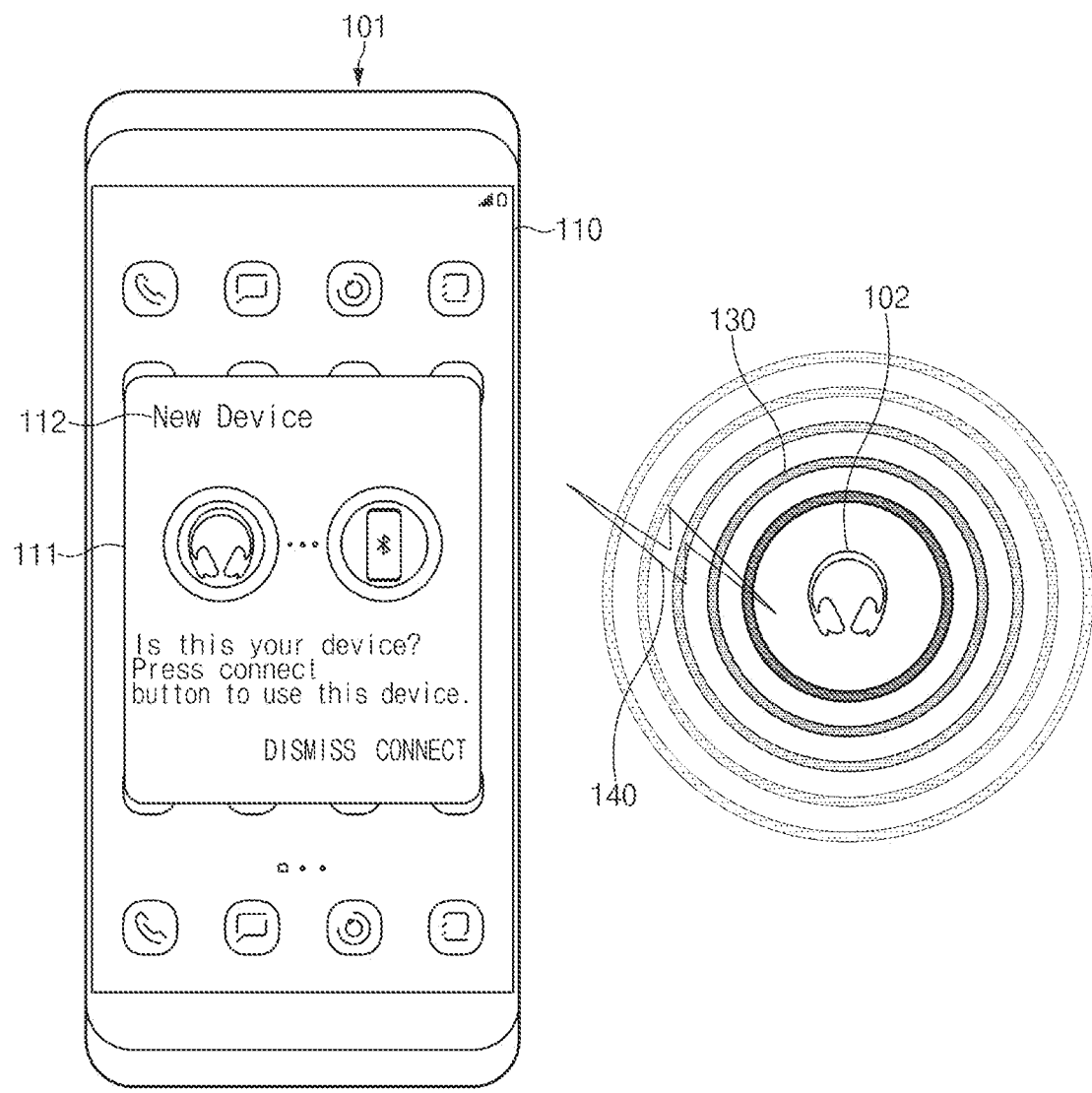
FIG. 1 is a view illustrating an electronic device wirelessly connected with an external device, according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. In some cases, even if terms are terms which are defined in the specification, they may not be interpreted to exclude embodiments of the disclosure.

An electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), a Moving Picture Experts Group (MPEG-1 or MPEG-2) audio layer 3 (MP3) players, mobile medical devices, cameras, and wearable devices. According to various embodiments of the disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the disclosure will be described with reference to the accompanying drawings. The term "user" used herein may refer to a person who uses an electronic device or may refer to a device (for example, an artificial electronic device) that uses an electronic device.

FIG. 1 is a view illustrating an electronic device wirelessly connected with an external device, according to various embodiments of the disclosure. FIG. 1 is provided for an illustrative purpose, and the disclosure is not limited thereto.

Referring to FIG. 1, a first electronic device 101 may wireless communicate with a second electronic device 102. For example, the first electronic device 101 may be a device such as a smartphone or a tablet PC. The second electronic device 102 may be a wireless headset, a wireless earphone, or a wearable device. According to an embodiment, the first electronic device 101 may recognize the second electronic device 102 through first wireless communication scheme 130 (e.g., Bluetooth low energy (BLE) communication).

According to an embodiment, the second electronic device 102 may generate an advertising signal and multicast or broadcast the advertising signal to surrounding devices through a communication module (transceiver, communication interface or a communication circuit) (not illustrated). The advertising signal may be a signal for transmitting pairing-related information to a surrounding electronic device (e.g., the first electronic device 101), which is not specified, through the first wireless communication scheme 130 (e.g., BLE communication).

According to an embodiment, the advertising signal may include at least one of identification information (device identification information) of the second electronic device 102, account information (user account information) of a user using the second electronic device 102, information (current pairing information) representing whether the second electronic device 102 is currently paired with another device, the list (pairing list) of devices previously paired with the second electronic device 102, information (simultaneous pairing information) on devices simultaneously allowing pairing with the second electronic device 102 or information (battery state information) on a remaining amount of a battery.

The second electronic device 102 may generate the advertising signal depending on a specified condition. For example, the second electronic device 102 may output the advertising signal when receiving power. For another example, the second electronic device 102 may output the advertising signal at specified time intervals. For another example, the second electronic device 102 may output the advertising signal when an input of a user is separately made.

According to various embodiments, the first electronic device 101 may output (or display), on a display 110, a user interface 111 for a pairing, when receiving the advertising signal from the second electronic device 102 through a communication module (or a communication circuit) (not illustrated). The first electronic device 101 may output the user interface 111 depending on various conditions, based on information included in the advertising signal. Additional information associated with the output of the user interface 111 will be described later with reference to FIGS. 2 to 9.

According to various embodiments, the user interface 111 may include device recognition information 112. The device recognition information 112 may represent a result obtained as the first electronic device 102 recognizes the second electronic device 102. The device recognition information 112 may represent whether the first electronic device 101 has been previously paired with the second electronic device 102 or may be displayed based on a user account. The additional information on the device recognition information 112 may be illustrated in FIG. 3.

When completing device recognizing and pairing procedures through the first wireless communication scheme 130, the first electronic device 101 may transmit/receive specified data (e.g., sound data or voice data) with the second electronic device 102 through a second wireless communication scheme 140 (e.g., Bluetooth (BT)) (pairing state).

Figure 2:
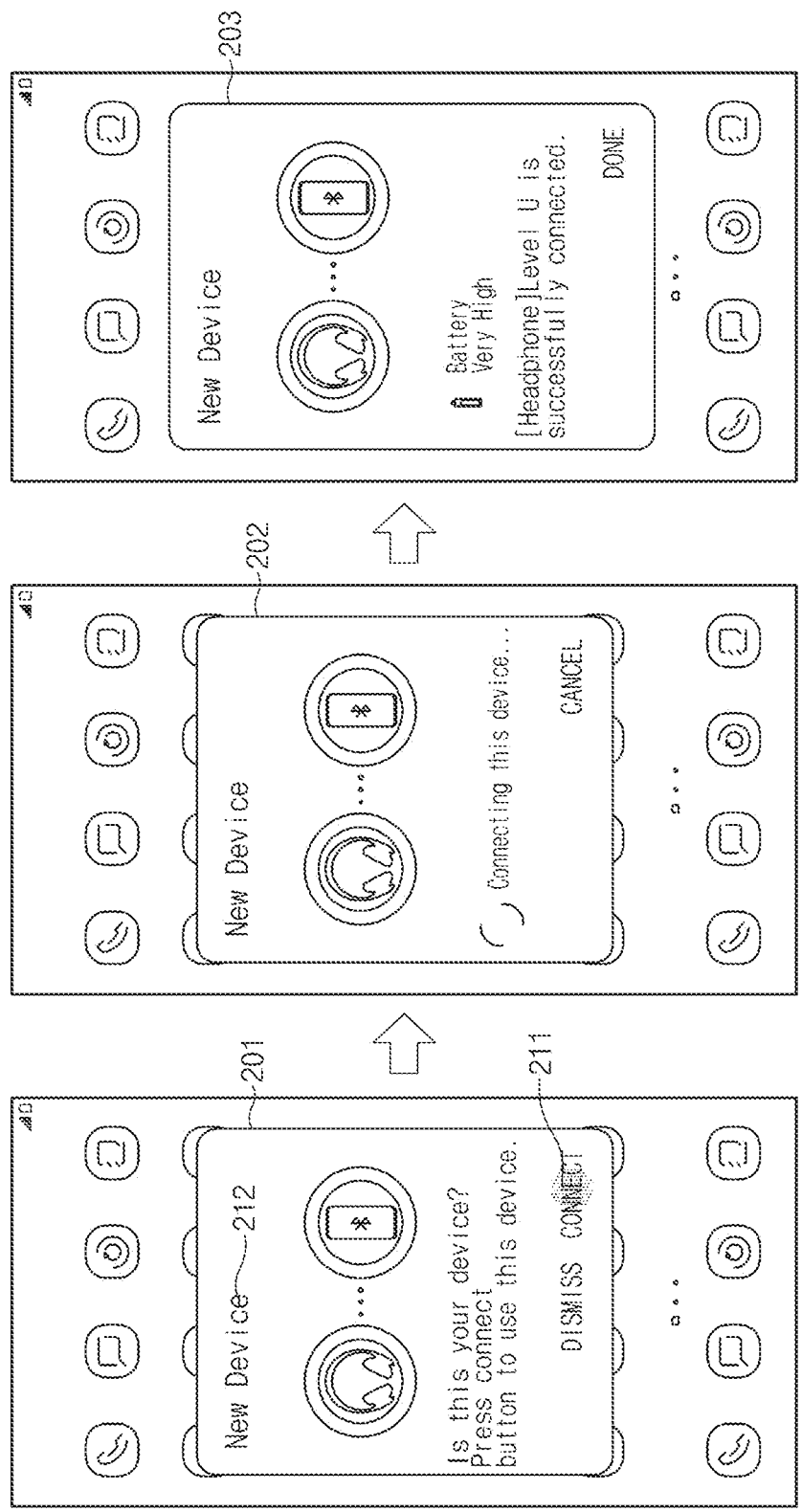
FIG. 2 illustrates a variation in a user interface depending on pairing procedures, according to various embodiments of the disclosure.

FIG. 2 illustrates a variation in a user interface depending on pairing procedures, according to various embodiments of the disclosure. FIG. 2 is provided for an illustrative purpose, and the disclosure is not limited thereto.

Referring to FIG. 2, the first electronic device 101 may output a user interface 201 for a pairing on the display 110 when receiving an advertising signal. The first electronic device 101 may output the user interface 201 depending on various conditions, based on information included in the advertising signal.

According to various embodiments, the user interface 201 may include information, which represents whether there exists a history of a pairing between the first electronic device 101 and the second electronic device 102 and device recognition information 212 representing whether the first electronic device 101 has a user account in common with the second electronic device 102.

When a user presses a button 211 for starting the pairing, the user interface 201 may be changed to a user interface 202 for displaying the progress of the pairing. The user interface 202 may display a text or an icon indicating that the connection is in progress.

When the pairing has been completed, the user interface 202 may be changed to a user interface 203 representing that the pairing has been completed. The user interface 203 may include status information (e.g., a battery level) of the connected second electronic device 102.

Figure 3:
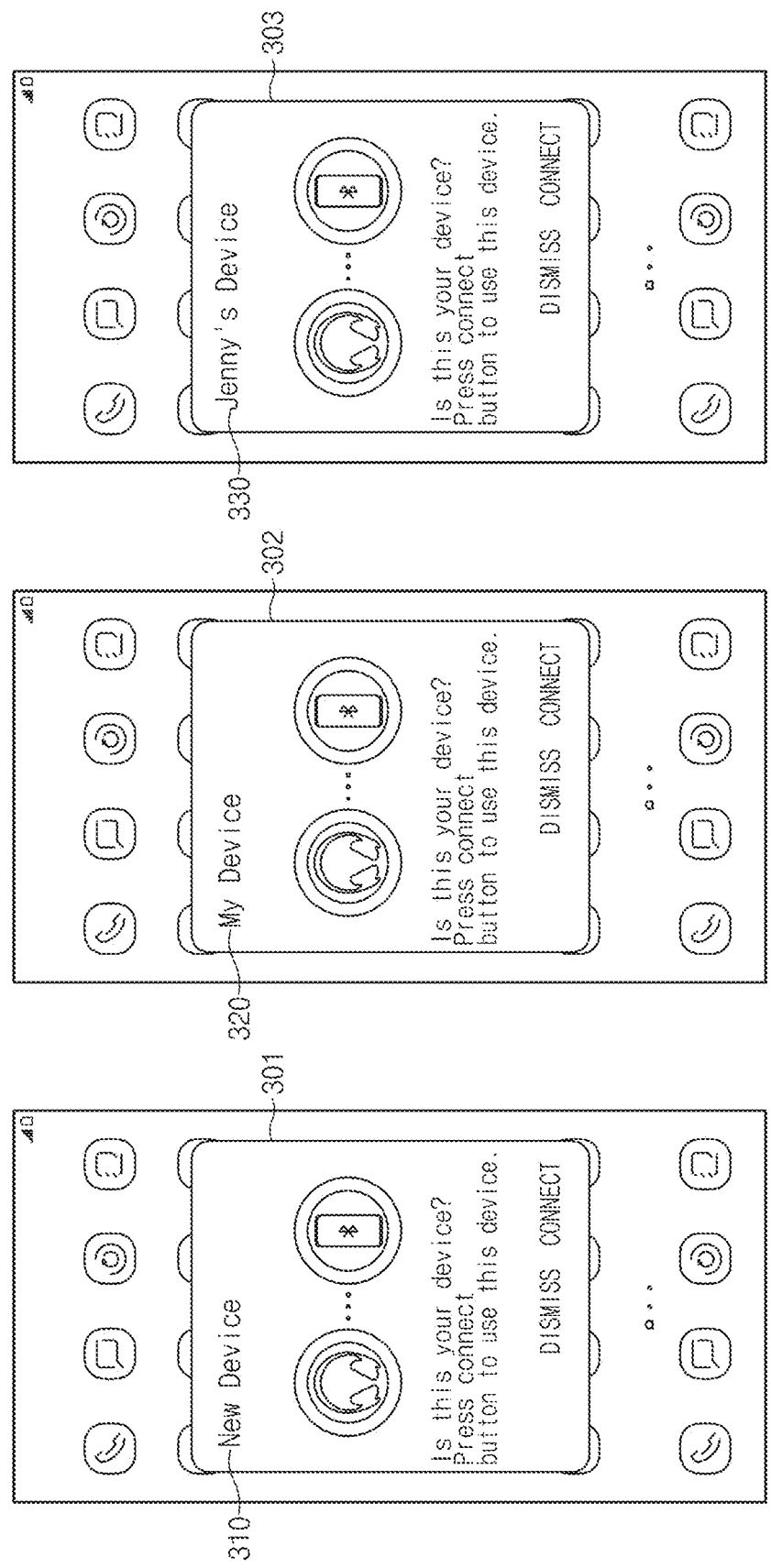
FIG. 3 is a view illustrating displaying device recognition information on a user interface, according to various embodiments of the disclosure.

FIG. 3 is a view illustrating displaying device recognition information on a user interface, according to various embodiments of the disclosure. FIG. 3 is provided for an illustrative purpose, and the disclosure is not limited thereto. Various types of user interfaces may be employed.

Referring to FIG. 3, the first electronic device 101 may output one of first to third user interfaces 301 to 303 (e.g., pop-up windows) depending on a pairing history or a user account, when recognizing the second electronic device 102 through the first wireless communication scheme 130.

The first electronic device 101 may output the first user interface 301 when a history of a previous pairing with the second electronic device 102 is absent. The first user interface 301 may include a device recognition mark 310 (e.g., a new device) representing that the history of the previous pairing with the second electronic device 102 is absent.

The first electronic device 101 may output the second user interface 302 when there exists the history of the previous pairing with the second electronic device 102. The second user interface 302 may include a device recognition mark 320_(e.g., My Device) representing that there exists the history of the previous pairing with the second electronic device 102. According to various embodiments, when the first electronic device 101 has a user account in common with the second electronic device 102, the first electronic device 101 may change the second user interface 302 to the third user interface 303.

The first electronic device 101 may output the third user interface 303 when the first electronic device 101 has a user account in common with the second electronic device 102. The third user interface 303 may include a device recognition mark 330 (e.g., Jenny's Device) including information on the common user account. For example, the first electronic device 101 may display a user identifier (ID) on the third user interface 303.

According to an embodiment, the first to third user interfaces 301 to 303 may further include description about pairing, buttons ("CONNECT" and "DISMISS") for connection/disconnection, and a remaining amount of a battery of the second electronic device 102.

Figure 4:
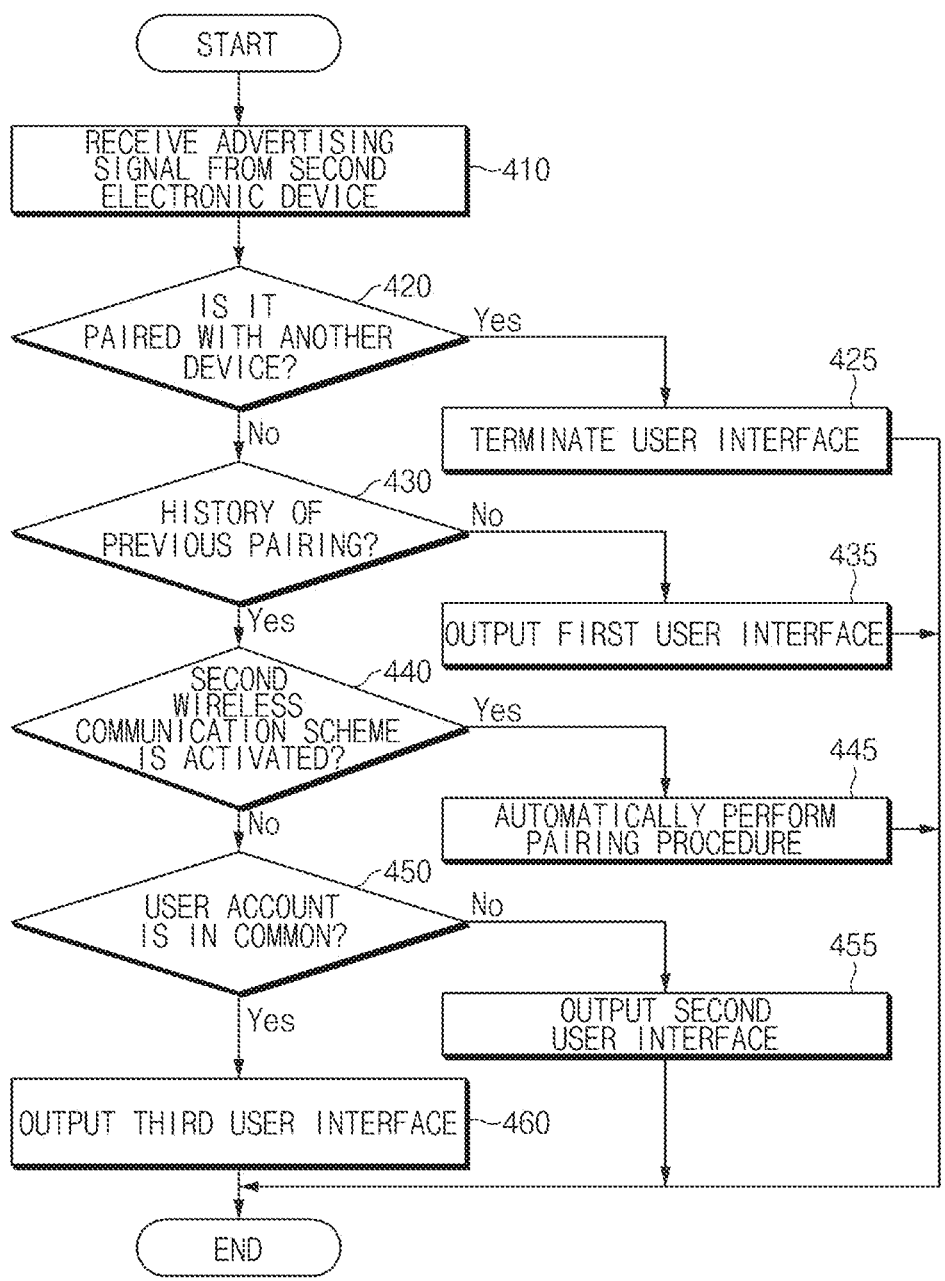
FIG. 4 is a flowchart illustrating a method of recognizing an external device, according to various embodiments of the disclosure.

FIG. 4 is a flowchart illustrating a method of recognizing an external device, according to various embodiments of the disclosure.

Referring to FIG. 4, in operation 410, the first electronic device 101 may receive an advertising signal from the second electronic device 102. The advertising signal may include at least one of device identification information of the second electronic device 102, user account information, current pairing information, a pairing list, simultaneous pairing information, or battery state information of the second electronic device 102

According to an embodiment, the advertising signal may further include information representing whether the second electronic device 102 is the out-of-box experience (OOBE) state (or a product initialization state or a product reset state). When the second electronic device 102 is in the OOBE state, the first electronic device 101 may determine whether the second wireless communication scheme 140 (e.g., BT) is activated. The first electronic device 101 may output the first user interface 310 (e.g., New Device) when the second wireless communication scheme 140 is activated. When the second wireless communication scheme 140 is deactivated, the first electronic device 101 may not perform an additional operation or may output a user interface for selecting whether to activate the second wireless communication scheme 140.

In operation 420, the first electronic device 101 may determine whether the second electronic device 102 is paired with another device, based on the current pairing information included in the advertising signal. For example, when the second electronic device 102 is paired with another device, the second electronic device 102 may set the current pairing information to "1" (e.g., "current status=1"). For example, when the second electronic device 102 is not paired with another device, the second electronic device 102 may set the current pairing information to "0" (e.g., "current status=0").

In operation 425, when the second electronic device 102 is paired with another electronic device (e.g., "current status=1"), the first electronic device 101 may terminate a user interface (e.g., the first to third user interfaces 301 to 303) for a pairing, which is being output, or may not perform an additional operation.

According to an embodiment, the first electronic device 101 may perform a pairing procedure, based on the simultaneous pairing information included in the advertising signal, even though the second electronic device 102 is paired with the other electronic device. For example, the second electronic device 102 may be a home speaker and may be paired with a plurality of electronic devices. The first electronic device 101 may perform the pairing procedure with the second electronic device 102 which is paired with another electronic device.

In operation 430, the first electronic device 101 may determine whether there exists the history of the pairing with the second electronic device 102, when the second electronic device 102 is not paired with the other device (e.g., "current status=0").

According to an embodiment, the first electronic device 101 may store, in an internal memory thereof, a list of devices previously paired with the first electronic device 101. The first electronic device 101 may determine whether the list contains the device identification information of the second electronic device 102 which is included in the advertising signal. The first electronic device 101 may determine that there exists the history of the pairing with the second electronic device 102, when the list contains the device identification information of the second electronic device 102.

According to another embodiment, the second electronic device 102 may transmit, to the first electronic device 101, a list of devices previously paired with the second electronic device 102 by using the advertising signal. The first electronic device 101 may determine that there exists the history of a pairing with the second electronic device 102, when the device identification information of the first electronic device 101 is contained in the list.

In operation 435, the first electronic device 101 may determine whether the second wireless communication scheme 140 (e.g., BT) is activated, when the history of pairing with the second electronic device 102 is absent. The first electronic device 101 may output the first user interface 310 (e.g., New Device) when the second wireless communication scheme 140 is activated. When the second wireless communication scheme 140 is not activated, the first electronic device 101 may not perform an additional operation or may output a user interface for selecting whether to activate the second wireless communication scheme 140.

In operation 440, the first electronic device 101 may determine whether the second wireless communication scheme 140 (e.g., BT) is activated, when there exists the history of the pairing with the second electronic device 102.

In operation 445, when the second wireless communication scheme 140 (e.g., BT) is activated, the first electronic device 101 may automatically perform a pairing procedure without separately outputting a user interface (e.g., the first to third user interfaces 301 to 303). The first electronic device 101 may transceive specified data (e.g., sound data or voice data) with the second electronic device 102 through the second wireless communication scheme 140 (e.g., BT).

According to an embodiment, the second electronic device 102 may change current pairing information (e.g., "current status=0→1"), when completing the pairing with the first electronic device 101. Accordingly, user interfaces for a pairing may be prevented from being continuously output by surrounding devices receiving an advertising signal.

In operation 450, the first electronic device 101 may determine whether the first electronic device 101 has a user account in common with the second electronic device 102 when the second wireless communication scheme 140 (e.g., BT) is not activated.

In operation 455, the first electronic device 101 may output the second user interface 302 (e.g., My Device) when the first electronic device 101 has no user account in common with the second electronic device 102.

In operation 460, the first electronic device 101 may output the third user interface 303 (e.g., Jenny's Device) when the first electronic device 101 has a user account in common with the second electronic device 102.

Figure 5:
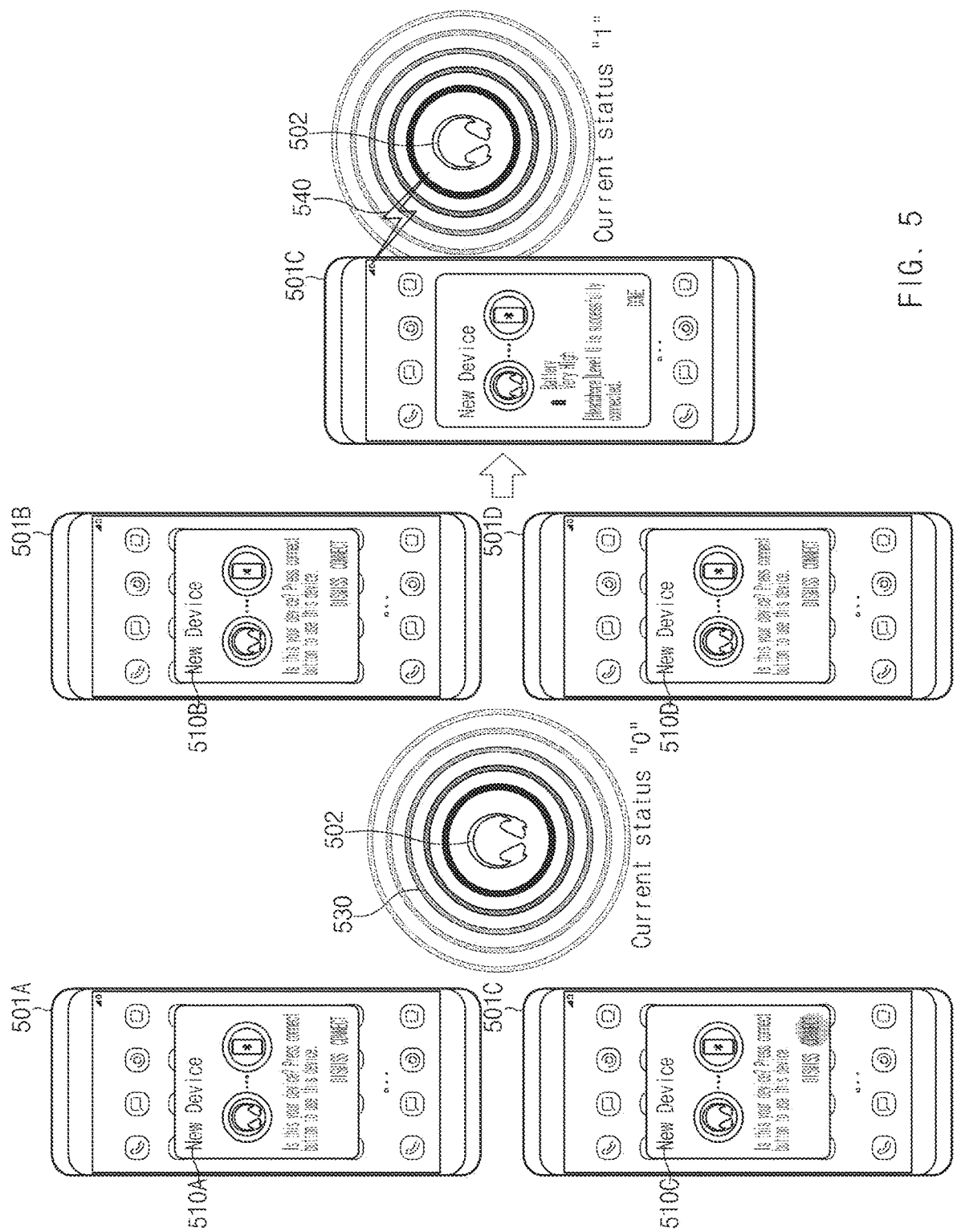
FIG. 5 illustrates a procedure that a plurality of surrounding devices output user interfaces for pairings based on current pairing information, according to various embodiments of the disclosure.

FIG. 5 illustrates a procedure that a plurality of surrounding devices output user interfaces for pairings based on current pairing information, according to various embodiments of the disclosure. FIG. 5 is provided for an illustrative purpose, and the disclosure is not limited thereto.

Referring to FIG. 5, a second electronic device 502 (e.g., the second electronic device 102 of FIG. 1) may generate an advertising signal and multi-cast or broadcast the advertising signal to surrounding devices. The advertising signal may be a signal for transmitting pairing-related information to a surrounding electronic device (e.g., a plurality of surrounding devices 501A to 501D), which is not specified, through a first wireless communication scheme 530 (e.g., BLE communication). For example, the advertising signal may include device identification information and current pairing information of the second electronic device 502.

For example, when the second electronic device 502 is not paired with another electronic device, the second electronic device 502 may set the current pairing information to "0" (e.g., "current status=0").

Each of the surrounding devices 501A to 501D recognizes that the current pairing information included in the advertising signal is set to "0", and may determine, by using device identification information of the second electronic device 502, whether there exists a history of a previous pairing with the second electronic device 502.

According to an embodiment, each of the surrounding devices 501A to 501D may store, in an internal memory thereof, a list of devices previously paired with a respective one among the surrounding devices 501A to 501D. Each of the surrounding devices 501A to 501D may determine whether the list contains the device identification information of the second electronic device 502, which is included in the advertising signal.

Each of the surrounding devices 501A to 501D may determine whether a second wireless communication scheme 540 (e.g., BT) is activated, when the history of the pairing with the second electronic device 502 is absent. The surrounding devices 501A to 501D may output respective user interfaces 510A to 510D (e.g., New Device) representing that there are no histories of pairings, when the second wireless communication scheme 540 is activated.

Users may select whether to perform pairing procedures in the surrounding devices 501A to 501D through the respective user interfaces 510A to 510D (e.g., New Device).

The second electronic device 502 may change the current pairing information (e.g., "current status=0→1") when receiving the request for a pairing progress from one among the surrounding devices 501A to 501D and completing the pairing procedure.

For example, the second electronic device 502 may change the current pairing information from "0" to "1" when receiving the request for a pairing progress from the surrounding device 501C and completing the pairing procedure.

Thereafter, another surrounding device 501A, 501B or 501D may recognize that the current pairing information of the advertising signal is changed and may terminate the output of the user interface 510A, 510B, or 510D.

According to an embodiment, the second electronic device 502 may perform a pairing procedure together with a surrounding device which has transmitted the earliest pairing request signal when receiving a plurality of pairing request signals. The surrounding device, which is failed to be paired, may output a connection error message.

Figure 6:
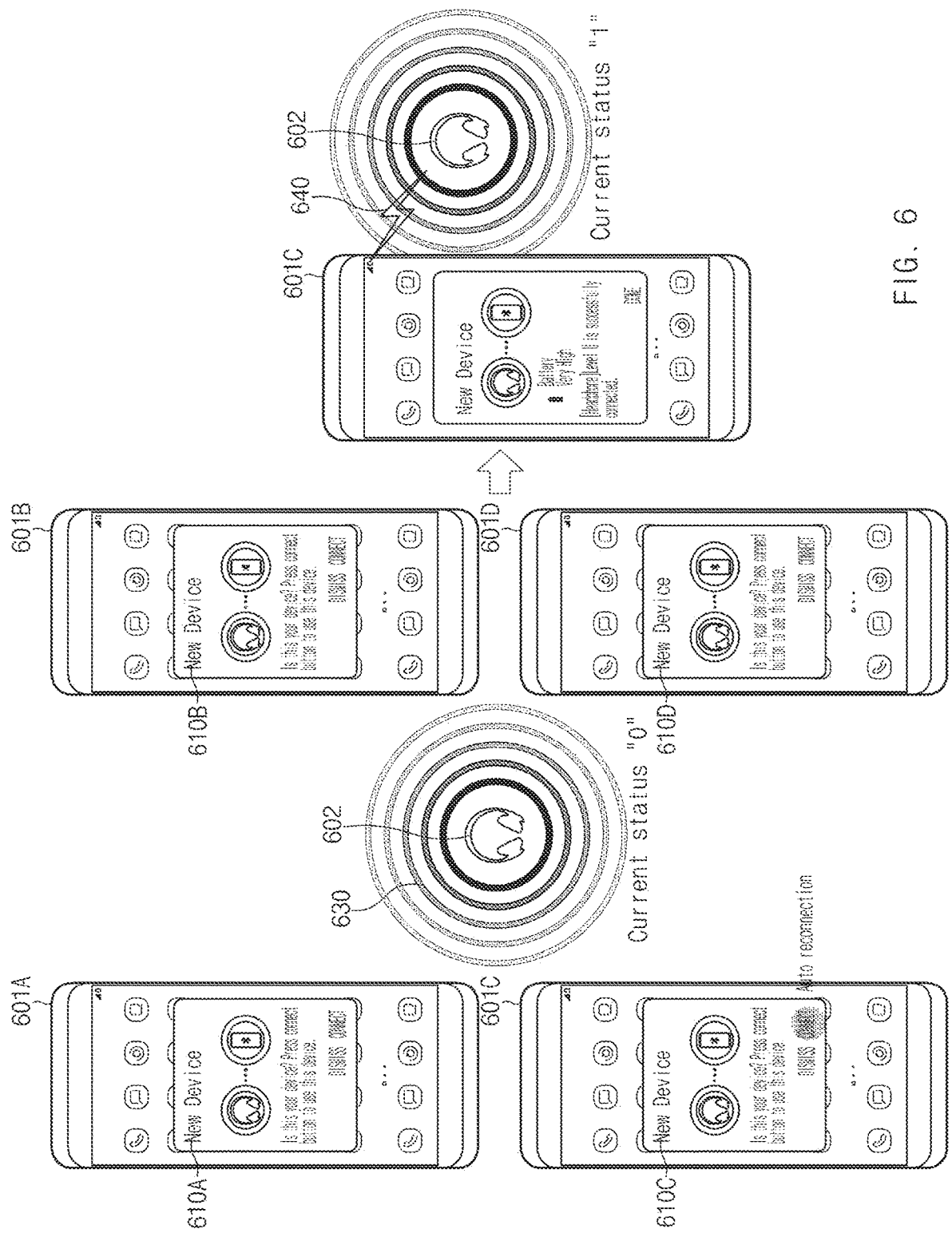
FIG. 6 illustrates a procedure that a plurality of surrounding devices output user interfaces for pairings based on current pairing information and a pairing history, according to various embodiments of the disclosure.

FIG. 6 illustrates a procedure that a plurality of surrounding devices output user interfaces for pairings, based on current pairing information and a pairing history, according to various embodiments of the disclosure. FIG. 6 is provided for an illustrative purpose, and the disclosure is not limited thereto.

Referring to FIG. 6, a second electronic device 602 (e.g., the second electronic device 102 of FIG. 1) may generate an advertising signal and multi-cast or broadcast the advertising signal to surrounding devices. The advertising signal may be a signal for transmitting pairing-related information to a surrounding electronic device (e.g., a plurality of surrounding devices 601A to 601D), which is not specified, through a first wireless communication scheme 630 (e.g., BLE communication). For example, the advertising signal may include device identification information and current pairing information of a second electronic device 602.

For example, when the second electronic device 602 is not paired with another electronic device, the second electronic device 602 may set the current pairing information to "0" (e.g., "current status=0").

Each of the surrounding devices 601A to 601D recognizes that the current pairing information included in the advertising signal is set to "0", and may determine, by using the device identification information of the second electronic device 602, whether there exists a history of a previous pairing with the second electronic device 602.

According to an embodiment, each of the surrounding devices 601A to 601D may store, in an internal memory thereof, a list of devices previously paired with a respective one among the surrounding devices 601A to 601D. Each of the surrounding devices 601A to 601D may determine whether the list contains device identification information of the second electronic device 602, which is included in the advertising signal.

The surrounding device 601C among the surrounding devices 601A to 601D may determine whether a second wireless communication scheme 640 (e.g., BT) is activated, when there exists the history of the previous pairing with the second electronic device 602. The surrounding device 601C may output a user interface 610C (e.g., My Device) when the second wireless communication scheme 640 is activated. According to an embodiment, the surrounding device 601C may automatically enter into a pairing state with the second electronic device 602 without separately outputting a user interface when the surrounding device 601C has the history of the previous pairing with the second electronic device and the second wireless communication scheme 640 (e.g., BT) is activated.

Another surrounding device 601A, 601B, or 601D may determine whether the second wireless communication scheme 640 (e.g., BT) is activated, when the other surrounding device 601A, 601B, or 601D has no history of the previous pairing with the second electronic device 602. The other surrounding device 601A, 601B, or 601D may output a user interface 610A, 610B, or 610D (e.g., New Device)

displaying that the pairing history is absent when the second wireless communication scheme 640 is activated.

The second electronic device 602 may change the current pairing information (e.g., "current status=0→1") when receiving the request for a pairing progress from the surrounding device 601C and completing the pairing procedure.

Thereafter, another surrounding device 601A, 601B or 601D may recognize that the current pairing information of the advertising signal is changed and may terminate the output of the user interface 610A, 610B, or 610D.

Figure 7:
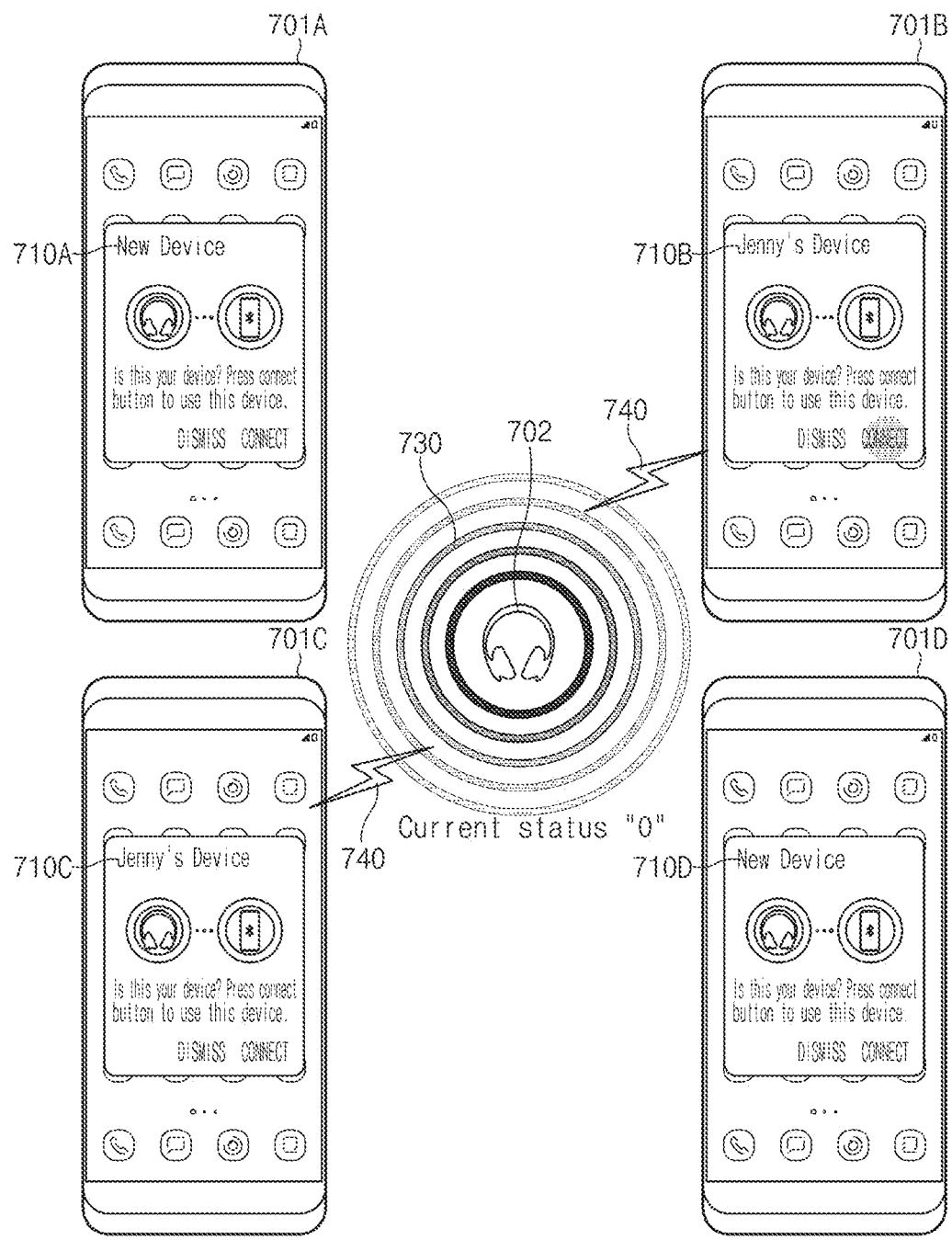
FIG. 7 illustrates a procedure that a plurality of surrounding devices output user interfaces for pairings, based on current pairing information and user account information, according to various embodiments of the disclosure.

FIG. 7 illustrates a procedure that a plurality of surrounding devices output user interfaces for pairings based on current pairing information and user account information, according to various embodiments of the disclosure. FIG. 7 is provided for an illustrative purpose, and the disclosure is not limited thereto.

Referring to FIG. 7, a second electronic device 702 (e.g., the second electronic device 102 of FIG. 1) may generate an advertising signal and multi-cast or broadcast the advertising signal to surrounding devices. The advertising signal may be a signal for transmitting pairing-related information to a surrounding electronic device (e.g., a plurality of surrounding devices 701A to 701D), which is not specified, through a first wireless communication scheme 730 (e.g., BLE communication). For example, the advertising signal may include device identification information, current pairing information, and user account information of the second electronic device 702.

For example, when the second electronic device 702 is not paired with another electronic device, the second electronic device 702 may set the current pairing information to "0" (e.g., "current status=0").

Each of the surrounding devices 701A to 701D recognizes that the current pairing information included in the advertising signal is set to "0", and may determine, by using the device identification information of the second electronic device 702, whether there exists a history of a previous pairing with the second electronic device 702.

According to an embodiment, each of the surrounding devices 701A to 701D may store, in an internal memory thereof, a list of devices previously paired with a respective one among the surrounding devices 701A to 701D. Each of the surrounding devices 701A to 701D may determine whether the list contains the device identification information of the second electronic device 702, which is included in the advertising signal.

For example, the surrounding device 701B among the surrounding devices 701A to 701D may determine whether a second wireless communication scheme 740 (e.g., BT) is activated and whether the surrounding device 701B has a user account in common with the second electronic device 702, when the surrounding device 701B has no history of a previous pairing with the second electronic device 702. The surrounding device 701B may output a user interface 710B (e.g., Jenny's Device) for a pairing in which the user account information of the second electronic device 702 is reflected, when the second wireless communication scheme 740 is activated and the surrounding device 701B has the user account in common with the second electronic device 702.

For another example, the surrounding device 701C among the surrounding devices 701A to 701D may determine whether the second wireless communication scheme 740 (e.g., BT) is activated when the surrounding device 701C has a history of a previous pairing with the second electronic device 702. The surrounding device 701C may automatically enter the pairing state with the second electronic device 702 when the second wireless communication scheme 740 (e.g., BT) is activated. When the second wireless communication scheme 740 (e.g., BT) is not activated and when the surrounding device 701C has a user account in common with the second electronic device 702, the surrounding device 701C may output the user interface 710C (e.g., Jenny's Device) for the pairing in which the user account information of the second electronic device 702 is reflected.

The second electronic device 702 may change the current pairing information (e.g., "current status=0→1") when receiving the request for a pairing progress from one among the surrounding devices 701A to 701D and completing the pairing procedure.

For example, the second electronic device 702 may change the current pairing information from "0" to "1" when receiving the request for a pairing progress from the surrounding device 701C and completing the pairing procedure.

Thereafter, another surrounding device 701A, 701B or 701D may recognize that the current pairing information of the advertising signal is changed and may terminate the output of the user interface 710A, 710B, or 710D.

Figure 8:
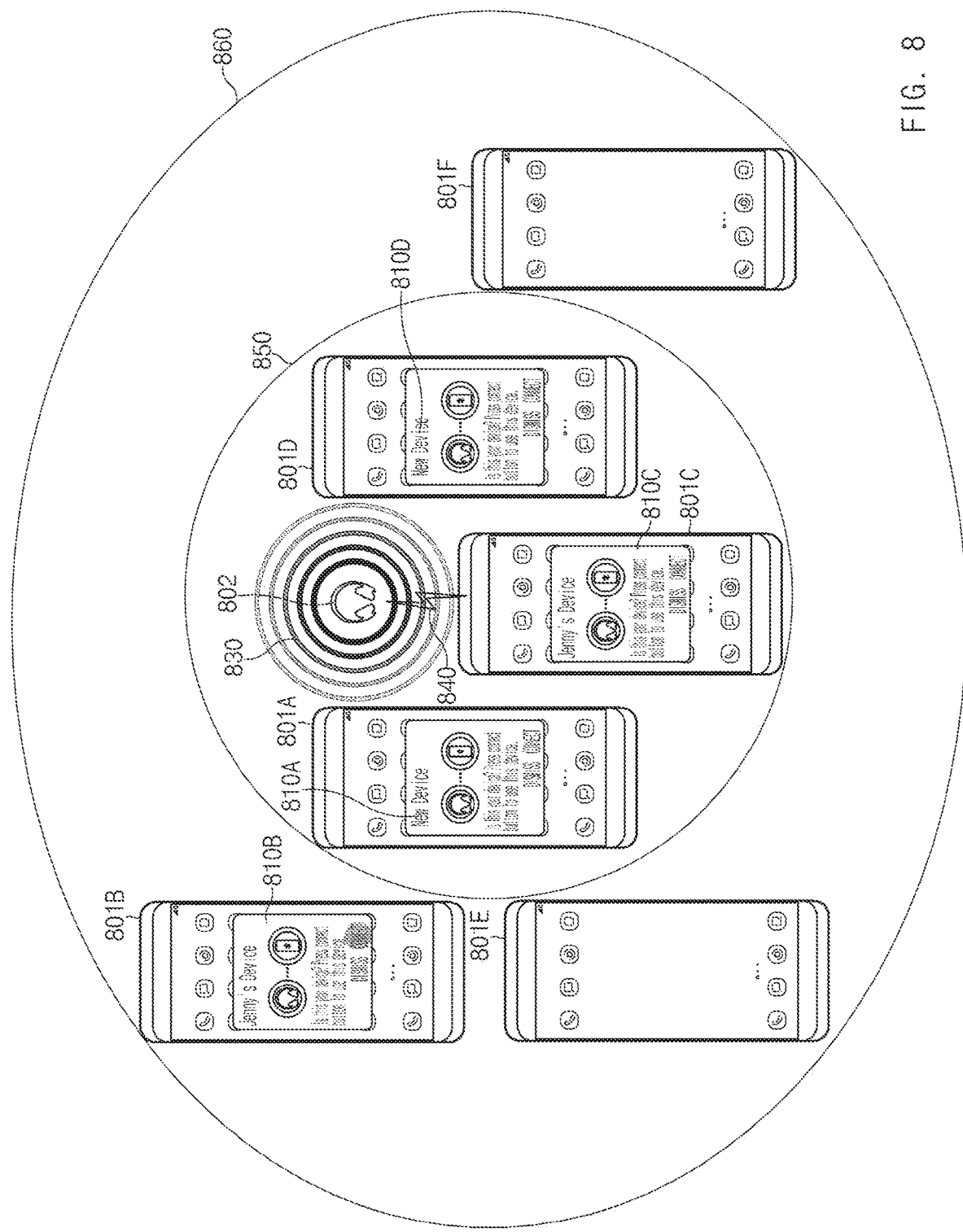
FIG. 8 is a view illustrating the connection with surrounding devices disposed at mutually different distances, according to various embodiments of the disclosure.

FIG. 8 is a view illustrating the connection with surrounding devices disposed at mutually different distances, according to various embodiments of the disclosure. FIG. 8 is provided for an illustrative purpose, and the disclosure is not limited thereto.

Referring to FIG. 8, a second electronic device 802 (e.g., the second electronic device 102 of FIG. 1) may generate an advertising signal and multi-cast or broadcast the advertising signal to surrounding devices. The advertising signal may be a signal for transmitting pairing-related information to a surrounding electronic device (e.g., a plurality of surrounding devices 801A to 801F), which is not specified, through the first wireless communication scheme 830 (e.g., BLE communication). For example, the advertising signal may include device identification information and current pairing information, and user account information of the second electronic device 802.

For example, when the second electronic device 802 is not paired with another electronic device, the second electronic device 802 may set the current pairing information to "0" (e.g., "current status=0").

According to various embodiments, each of a plurality of surrounding devices 801A to 801F may determine whether to output a user interface for a pairing, based on the intensity (or the distance from the second electronic device 802 measured by using the intensity of the advertising signal) of the advertising signal.

For example, the surrounding device 801A, 801C or 801D belonging to a first group is disposed within a first distance range 850 (e.g., 60 cm) from the second electronic device 802 and the surrounding device 801B, 801E, or 801F belonging to a second group may be disposed within a second distance range 860 (e.g., 30 m) out of the first distance range 850.

The surrounding device 801A, 801C or 801D belonging to the first group may output a user interface 810A, 810C, or 810D for a pairing, based on a history of a previous pairing with the second electronic device 802 or user account information of the second electronic device 802. For example, when the surrounding device 801A or 801D has neither the history of the previous pairing with the second electronic device 802 nor user account information in common with the second electronic device 802, the surrounding device 801A or 801D may output the user interface 810A or 810D representing that the history of the previous pairing (e.g., New Device) is absent. When the surrounding device 801C has the history of the previous pairing history and the common user account information, the surrounding device 801C may output the user interface 810C (e.g., Jenny's Device) in which the user account information is reflected.

The surrounding device 801B, 801E, or 801F belonging to the second group may determine whether to output a user interface for a pairing, based on the user account information. For example, when the surrounding device 801B is disposed out of the first distance range 850 to receive an advertising signal having intensity weaker than a preset reference value, and has the common account information, the surrounding device 801B may output a user interface 810B (e.g., Jenny's Device) in which the user account information is reflected. In contrast, when the surrounding device 801E or 801F is disposed out of the first distance range 850 to receive an advertising signal having intensity weaker than the preset reference value, and has no common account information, the surrounding device 801E or 801F may not output a user interface separately.

Figure 9:
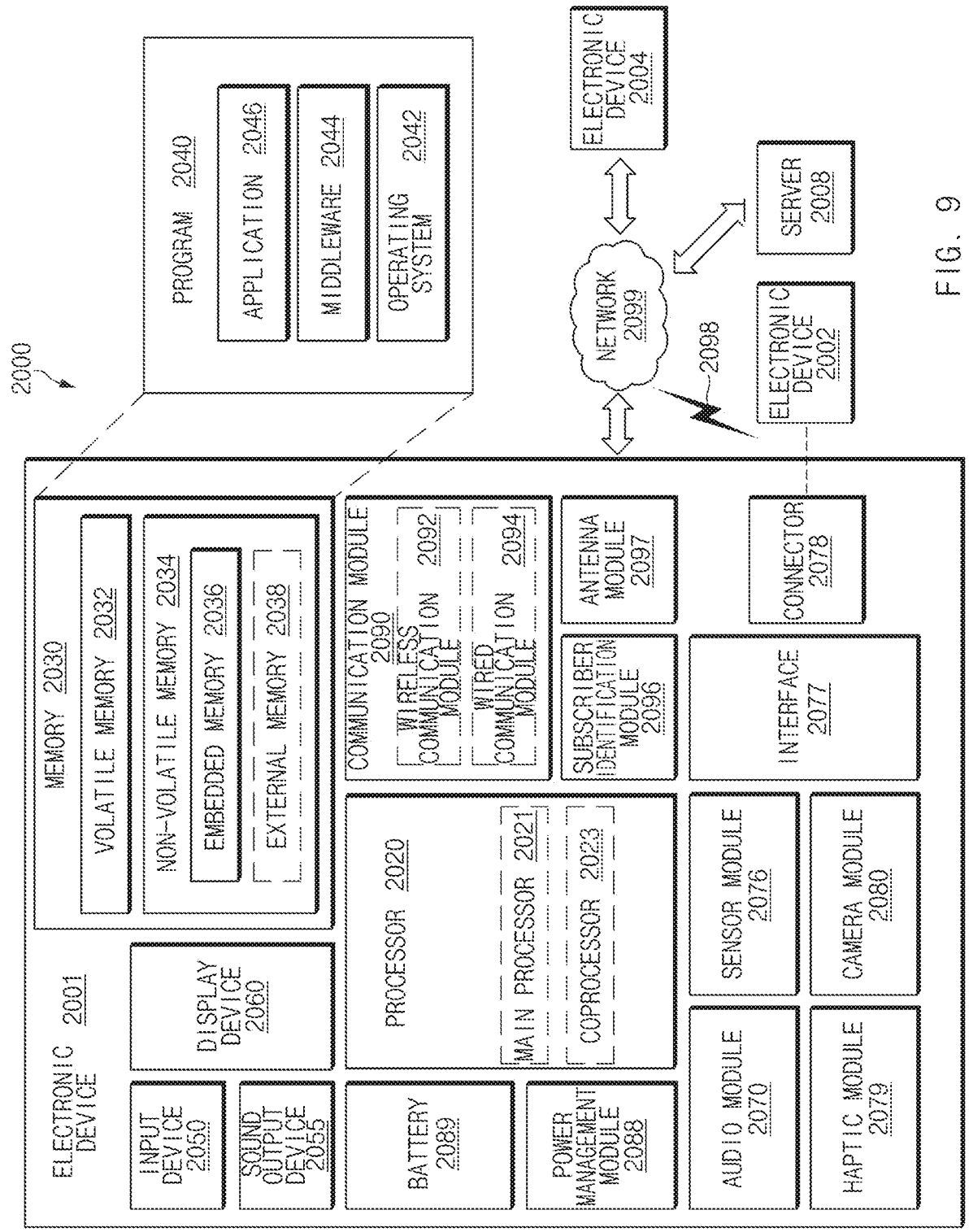
FIG. 9 is a block diagram illustrating an electronic device under a network environment, according to various embodiments of the disclosure.

FIG. 9 is a block diagram illustrating an electronic device under a network environment, according to various embodiments of the disclosure.

Referring to FIG. 9, under the network environment 2000, the electronic device 2001 (e.g., the electronic device 101) may communicate with an electronic device 2002 through local wireless communication 2098 or may communication with an electronic device 2004 or a server 2008 through a network 2099. According to an embodiment, the electronic device 2001 may communicate with the electronic device 2004 through the server 2008.

According to an embodiment, the electronic device 2001 may include a bus (not shown), a processor 2020, a memory 2030, an input device 2050 (e.g., a microphone or a mouse), a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, and an antenna module 2097. According to an embodiment, the electronic device 2001 may not include at least one (e.g., the display device 2060 or the camera module 2080) of the above-described elements or may further include other element(s).

The bus may interconnect the above-described elements 2020 to 2090 and may include a circuit for conveying signals (e.g., a control message or data) between the above-described elements. The processor 2020 may include one or more of a CPU, an AP, a graphics processing unit (GPU), an image signal processor (ISP) of a camera, a main processor 2021, coprocessor 2023 or a communication processor (CP). According to an embodiment, the processor 2020 may be implemented with a system on chip (SoC) or a system in package (SiP). For example, the processor 2020 may drive an operating system (OS) or an application to control at least one of another element (e.g., hardware or software element) connected to the processor 2020 and may process and compute various data. The processor 2020 may load a command or data, which is received from at least one of other elements (e.g., the communication module 2090), into a volatile memory 2032 to process the command or data and may store the result data into a nonvolatile memory 2034.

The memory 2030 may include, for example, the volatile memory 2032 or the nonvolatile memory 2034. The volatile memory 2032 may include, for example, a random access memory (RAM) (e.g., a dynamic RANI (DRAM), a static RAM (SRAM), or a synchronous DRAM (SDRAM)). The nonvolatile memory 2034 may include, for example, an one time programmable read-only memory (OTPROM), a programmable read only memory (PROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2034 may be configured in the form of an internal memory 2036 or the form of an external memory 2038 which is available through connection only if necessary, according to the connection with the electronic device 2001. The external memory 2038 may further include a flash drive such as compact flash (CF), secure digital (SD), micro-SD, mini-SD, extreme digital (xD), a multi-media card (MMC), or a memory stick. The external memory 2038 may be operatively or physically connected with the electronic device 2001 in a wired manner (e.g., a cable or a universal serial bus (USB)) or a wireless (e.g., BT) manner.

For example, the memory 2030 may store, for example, at least one different software element, such as a command or data associated with the program 2040, of the electronic device 2001. The program 2040 may include, for example, a kernel, a library, an application framework, operating system 2042, middleware 2044 or an application program (interchangeably, "application") 2046.

The input device 2050 may include a microphone, a mouse, or a keyboard. According to an embodiment, the keyboard may include a keyboard physically connected or a virtual keyboard displayed through the display 2060.

The display 2060 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2001.

The audio module 2070 may convert, for example, from a sound into an electrical signal or from an electrical signal into the sound. According to an embodiment, the audio module 2070 may acquire sound through the input device 2050 (e.g., a microphone) or may output sound through an output device (not illustrated) (e.g., a speaker or a receiver) included in the electronic device 2001, an external electronic device (e.g., the electronic device 2002 (e.g., a wireless speaker or a wireless headphone)) or an electronic device 2006 (e.g., a wired speaker or a wired headphone) connected with the electronic device 2001

The sensor module 2076 may measure or detect, for example, an internal operating state (e.g., power or temperature) of the electronic device 2001 or an external environment state (e.g., an altitude, a humidity, or brightness) to generate an electrical signal or a data value corresponding to the information of the measured state or the detected state. The sensor module 2076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 2076 may further include a control circuit for controlling at least one or more sensors included therein. According to an embodiment, the sensor module 2076 may be controlled by using the processor 2020 or a processor (e.g., a sensor hub) separate from the processor 2020. In the case that the separate processor (e.g., a sensor hub) is used, while the processor 2020 is in a sleep state, the separate processor may operate without awakening the processor 2020 to control at least a portion of the operation or the state of the sensor module 2076.

According to an embodiment, the interface 2077 may include a high definition multimedia interface (HDMI), a USB, an optical interface, a recommended standard 232 (RS-232), a D-subminiature (D-sub), a mobile high-definition link (MHL) interface, an SD card/MMC interface, or an audio interface. A connector 2078 may physically connect the electronic device 2001 and the electronic device 2006. According to an embodiment, the connector 2078 may include, for example, an USB connector, an SD card/MMC connector, or an audio connector (e.g., a headphone connector).

The haptic module 2079 may convert an electrical signal into mechanical stimulation (e.g., vibration or motion) or into electrical stimulation. For example, the haptic module 2079 may apply tactile or kinesthetic stimulation to a user. The haptic module 2079 may include, for example, a motor, a piezoelectric element, or an electric stimulator.

The camera module 2080 may capture, for example, a still image and a moving picture. According to an embodiment, the camera module 2080 may include at least one lens (e.g., a wide-angle lens and a telephoto lens, or a front lens and a rear lens), an image sensor, an ISP, or a flash (e.g., an LED or a xenon lamp).

The power management module 2088, which is to manage the power of the electronic device 2001, may constitute at least a portion of a power management integrated circuit (PMIC).

The battery 2089 may include a primary cell, a secondary cell, or a fuel cell and may be recharged by an external power source to supply power at least one element of the electronic device 2001.

The communication module 2090 may establish a communication channel between the electronic device 2001 and an external device (e.g., the first external electronic device 2002, the second external electronic device 2004, or the server 2008). The communication module 2090 may support wired communication or wireless communication through the established communication channel. According to an embodiment, the communication module 2090 may include a wireless communication module 2092 or a wired communication module 2094. The communication module 2090 may communicate with the external device (e.g., the first external electronic device 2002, the second external electronic device 2004, or the server 2008) through a first network 2098 (e.g. a wireless local area network (LAN) such as BT or infrared data association (IrDA)) or a second network 2099 (e.g., a wireless wide area network such as a cellular network) through a relevant module among the wireless communication module 2092 or the wired communication module 2094.

The wireless communication module 2092 may support, for example, cellular communication, local wireless communication, or global navigation satellite system (GNSS) communication. The cellular communication may include, for example, long-term evolution (LTE), LTE advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), BT, BLE, Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 2092 supports cellar communication, the wireless communication module 2092 may, for example, identify or authenticate the electronic device 2001 within a communication network using the subscriber identification module (e.g., a SIM card) 2096. According to an embodiment, the wireless communication module 2092 may include a CP separate from the processor 2020 (e.g., an AP). In this case, the CP may perform at least a portion of functions associated with at least one of elements 2020 to 2096 of the electronic device 2001 in substitution for the processor 2020 when the processor 2020 is in an inactive (sleep) state, and together with the processor 2020 when the processor 2020 is in an active state. According to an embodiment, the wireless communication module 2092 may include a plurality of communication modules, each supporting only a relevant communication scheme among cellular communication, local wireless communication, or a GNSS communication.

The wired communication module 2094 may include, for example, include an LAN service, a power line communication, or a plain old telephone service (POTS).

For example, the first network 2098 may employ, for example, Wi-Fi direct or BT for transmitting or receiving commands or data through wireless direct connection between the electronic device 2001 and the first external electronic device 2002. The second network 2099 may include a telecommunication network (e.g., a computer network such as a LAN or a wide area network (WAN), the Internet or a telephone network) for transmitting or receiving commands or data between the electronic device 2001 and the second electronic device 2004.

According to various embodiments, the commands or the data may be transmitted or received between the electronic device 2001 and the second external electronic device 2004 through the server 2008 connected with the second network 2099. Each of the first and second external electronic devices 2002 and 2004 may be a device of which the type is different from or the same as that of the electronic device 2001. According to various embodiments, all or a part of operations that the electronic device 2001 will perform may be executed by another or a plurality of electronic devices (e.g., the electronic devices 2002 and 2004 or the server 2008). According to an embodiment, in the case that the electronic device 2001 executes any function or service automatically or in response to a request, the electronic device 2001 may not perform the function or the service internally, but may alternatively or additionally transmit requests for at least a part of a function associated with the electronic device 2001 to any other device (e.g., the electronic device 2002 or 2004 or the server 2008). The other electronic device (e.g., the electronic device 2002 or 2004 or the server 2008) may execute the requested function or additional function and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

According to various embodiments, an electronic device includes a display device, a memory, a communication module configured to support a first wireless communication scheme and a second wireless communication scheme, and a processor electrically connected with the display device, the memory, and the communication module, wherein the communication module receives an advertising signal, which is based on the first wireless communication scheme, from an external device, wherein the advertising signal includes device identification information of the external device and pairing information representing whether the external device is current paired with another device, and wherein the processor is configured to determine, based on the pairing information, whether the external device is paired with a device, when there is absent the device in the pairing state with the external device, output a user interface for performing a pairing with the external device, by using at least one of a history of a pairing with the external device, whether the second wireless communication scheme is activated, or user account information, perform the pairing with the external device, in response to a user input made through the user interface, and transceive, with the external device, data based on the second wireless communication scheme through the communication module, when the pairing is completed.

According to various embodiments, the processor is configured to output, as the user interface, one of a first user interface representing that the history of the pairing with the external device is absent, a second user interface representing that the history of the pairing with the external device is present, or a third user interface representing that the user account information is identical to user account information of the external device.

According to various embodiments, the memory stores a list of a device previously paired with the electronic device, and the processor is configured to determine whether there exists the pairing history by determining whether the device identification information is included in the list.

According to various embodiments, the processor is configured to output the first user interface when the device identification information is not included in the list.

According to various embodiments, the processor is configured to determine whether the second wireless communication scheme is activated, when the device identification information is included in the list.

According to various embodiments, the processor is configured to automatically perform the pairing with the external device when the second wireless communication scheme is activated.

According to various embodiments, the processor is configured to compare first user account information of the electronic device with second user account information of the external device, which is included in the advertising signal, when the second wireless communication scheme is not activated.

According to various embodiments, the processor is configured to output the third user interface including a user ID based on the first user account information or the second user account information, when the first user account information is identical to the second user account information.

According to various embodiments, the processor is configured to terminate outputting the user interface, when the external device is paired with another device.

According to various embodiments, the processor is configured to when the advertising signal has intensity equal to or less than a preset reference value, compare first user account information of the electronic device with second user account information of the external device, which is included in the advertising signal; and output the user interface.

According to various embodiments, the processor is configured to output the user interface including a user ID based on the first user account information or the second user account information, when the first user account information is identical to the second user account information.

According to various embodiments, the processor is configured to terminate outputting the user interface when intensity of the advertising signal is changed to be equal to or less than a preset reference value.

According to various embodiments, the first wireless communication scheme is a communication scheme based on a BLE technology, and the second wireless communication scheme is a communication scheme based on a BT technology.

According to various embodiments, the advertising signal includes information on the number of devices allowing simultaneous pairings with the external device, and the processor is configured to output the user interface when the number of devices in a pairing state with the external device is smaller than the number of the devices allowing the simultaneous pairings with the external device.

According to various embodiments, a method for wirelessly communicating with an external device, the method includes receiving, from the external device, an advertising signal including device identification information of the external device and pairing information representing whether the external device is currently paired with another device, through a first wireless communication scheme, determining, based on the pairing information, whether there exists a device currently paired with the external device, outputting a user interface for performing a pairing with the external device, by using at least one of a history of a pairing with the external device, whether a second wireless communication scheme is activated, or user account information, when there is absent the device in the pairing state with the external device, performing the pairing with the external device, in response to a user input made through the user interface, and transceiving, with the external device, data based on the second wireless communication scheme when the pairing is completed.

According to various embodiments, the outputting of the user interface includes terminating outputting the user interface, when the external device is currently paired with another device.

According to various embodiments, the outputting of the user interface includes outputting, as the user interface, one of a first user interface representing that the history of the pairing with the external device is absent, a second user interface representing that the history of the pairing with the external device is present, or a third user interface representing that the user account information is identical to user account information of the external device.

According to various embodiments, the outputting of the user interface includes determining whether the device identification information is included in a list of a device previously paired with an electronic device and stored in a memory, by using the list.

According to various embodiments, the outputting of the user interface includes determining whether the second wireless communication scheme is activated, when the device identification information is included in the list.

According to various embodiments, the outputting of the user interface includes comparing first user account information of the electronic device with second user account information of the external device, which is included in the advertising signal, when the second wireless communication scheme is not activated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display device;
    a memory;
    a communication interface configured to support a first wireless communication scheme and a second wireless communication scheme; and
    a processor electrically connected with the display device, the memory, and the communication interface,
    wherein the communication interface receives a first advertising signal, which is based on the first wireless communication scheme, from a wearable device,
    wherein the first advertising signal includes device identification information of the wearable device and pairing information representing whether the wearable device is currently paired with another device, and
    wherein the processor is configured to:
        determine, based on the pairing information, whether the wearable device is currently paired with the electronic device,
        when the wearable device is not paired, output a user interface for performing a pairing with the wearable device, if at least one of a history of a pairing with the wearable device and user account information in common with the wearable device is present,
        perform the pairing with the wearable device, in response to a user input received through the output user interface, and
        transceive, with the wearable device, data based on the second wireless communication scheme through the communication interface, when the pairing is completed,
    wherein the processor is further configured to, if a second advertising signal from the wearable device is received while the user interface is output, terminate the user interface in response to the second advertising signal indicating that the wearable device is paired with another device.

2. The electronic device of claim 1, wherein the processor is further configured to:
    output, as the user interface, one of a first user interface representing that the history of the pairing with the wearable device is absent, a second user interface representing that the history of the pairing with the wearable device is present, or a third user interface representing that the user account information is identical to user account information of the wearable device.

3. The electronic device of claim 2,
    wherein the memory stores a list of a device previously paired with the electronic device, and
    wherein the processor is further configured to determine whether a pairing history exists by determining whether the device identification information is included in the list.

4. The electronic device of claim 3, wherein the processor is further configured to:
    output the first user interface when the device identification information is not included in the list.

5. The electronic device of claim 3, wherein the processor is further configured to:
    determine whether the second wireless communication scheme is activated, when the device identification information is included in the list.

6. The electronic device of claim 5, wherein the processor is further configured to:
    automatically perform the pairing with the wearable device when the second wireless communication scheme is activated.

7. The electronic device of claim 5, wherein the processor is further configured to:
    compare first user account information of the electronic device with second user account information of the wearable device, which is included in the first advertising signal, when the second wireless communication scheme is not activated.

8. The electronic device of claim 7, wherein the processor is further configured to:
    output the third user interface including a user identifier (ID) based on the first user account information or the second user account information, when the first user account information is identical to the second user account information.

9. The electronic device of claim 1, wherein the processor is further configured to:
    when the first advertising signal has intensity equal to or less than a preset reference value, compare first user account information of the electronic device with second user account information of the wearable device, which is included in the first advertising signal; and
    output the user interface.

10. The electronic device of claim 9, wherein the processor is further configured to:
    output the user interface including a user ID based on the first user account information or the second user account information, when the first user account information is identical to the second user account information.

11. The electronic device of claim 1, wherein the processor is further configured to:
    terminate outputting the user interface when intensity of the first advertising signal is changed to be equal to or less than a preset reference value.

12. The electronic device of claim 1,
    wherein the first wireless communication scheme is a communication scheme based on a Bluetooth low energy (BLE) technology, and
    wherein the second wireless communication scheme is a communication scheme based on a Bluetooth (BT) technology.

13. The electronic device of claim 1,
wherein the first advertising signal includes information on a number of devices allowing simultaneous pairings with the wearable device, and
wherein the processor is further configured to output the user interface when a number of devices in a pairing state with the wearable device is smaller than the number of the devices allowing the simultaneous pairings with the wearable device.

14. The electronic device of claim 1, wherein the user interface includes a device recognition mark for indicating a pairing state of the electronic device.

15. A method for wirelessly communicating with a wearable device, the method comprising:
receiving, from the wearable device, a first advertising signal including device identification information of the wearable device and pairing information representing whether the wearable device is currently paired with another device, through a first wireless communication scheme;
determining, based on the pairing information, whether the wearable device is currently paired with an electronic device;
outputting a user interface for performing a pairing with the wearable device, if at least one of a history of a pairing with the wearable device and user account information in common with the wearable device is present, when the wearable device is not paired;
performing the pairing with the wearable device, in response to a user input received through the output user interface;
transceiving, with the wearable device, data based on a second wireless communication scheme when the pairing is completed; and
if a second advertising signal from the wearable device is received while the user interface is output, terminating the user interface in response to the second advertising signal indicating that the wearable device is paired with another device.

16. The method of claim 15, wherein the outputting of the user interface includes:
outputting, as the user interface, one of a first user interface representing that the history of the pairing with the wearable device is absent, a second user interface representing that the history of the pairing with the wearable device is present, or a third user interface representing that the user account information is identical to user account information of the wearable device.

17. The method of claim 15, wherein the outputting of the user interface includes:
determining whether the device identification information is included in a list of a device previously paired with an electronic device and stored in a memory, by using the list.

18. The method of claim 17, wherein the outputting of the user interface includes:
determining whether the second wireless communication scheme is activated, when the device identification information is included in the list.

19. The method of claim 18, wherein the outputting of the user interface includes:
comparing first user account information of the electronic device with second user account information of the wearable device, which is included in the first advertising signal, when the second wireless communication scheme is not activated.

20. The method of claim 15, wherein a type of the user interface output is based on product state information in the pairing information.

* * * * *